(12) United States Patent
Marcigliano et al.

(10) Patent No.: US 8,380,404 B2
(45) Date of Patent: Feb. 19, 2013

(54) CONTROL METHOD OF A VEHICLE PROVIDED WITH AN AUTOMATIC MANUAL TRANSMISSION DURING A GEAR SHIFTING OR DURING A DRIVE-AWAY

(75) Inventors: Francesco Marcigliano, Maranello (IT); Alessandro Barone, Bologna (IT); Davide Montosi, Formigine (IT)

(73) Assignee: Ferrari S.p.A. (IT)

( * ) Notice: Subject to any disclaimer, the term of this patent is extended or adjusted under 35 U.S.C. 154(b) by 380 days.

(21) Appl. No.: 12/755,258

(22) Filed: Apr. 6, 2010

(65) Prior Publication Data
US 2010/0280721 A1 Nov. 4, 2010

(30) Foreign Application Priority Data
Apr. 6, 2009 (IT) .............................. BO2009A0221

(51) Int. Cl.
*B60W 10/00* (2006.01)
(52) U.S. Cl. ............. 701/54; 701/56; 192/3.51; 477/83; 477/110
(58) Field of Classification Search ................... 701/54, 701/56, 58, 61; 192/3.51, 32; 477/70, 76, 477/83, 110
See application file for complete search history.

(56) References Cited

U.S. PATENT DOCUMENTS

| | | | | |
|---|---|---|---|---|
| 6,705,971 B2* | 3/2004 | Kayano et al. | ............... | 477/110 |
| 6,846,269 B2* | 1/2005 | Reuschel et al. | ............... | 477/110 |
| 6,847,878 B2* | 1/2005 | Cimmino et al. | ............... | 701/56 |
| 7,094,176 B2* | 8/2006 | Budal et al. | ........................ | 477/5 |
| 7,121,390 B2* | 10/2006 | Reuschel | ..................... | 192/3.58 |
| 2003/0054920 A1* | 3/2003 | Berger et al. | .................... | 477/70 |
| 2009/0018737 A1* | 1/2009 | Amisano et al. | ................. | 701/60 |
| 2011/0098895 A1* | 4/2011 | Marcigliano et al. | ........... | 701/54 |

FOREIGN PATENT DOCUMENTS

| | | |
|---|---|---|
| DE | 10113700 A1 | 9/2002 |
| EP | 1262360 A1 | 12/2002 |
| EP | 1475556 A2 | 11/2004 |
| FR | 2819564 A1 | 7/2002 |
| FR | 2854848 A1 | 11/2004 |
| FR | 2910101 A1 | 6/2008 |
| WO | WO-2007/148203 A2 | 12/2007 |

OTHER PUBLICATIONS

"Italian Application Serial No. IT BO20090221, Italian Search Report dated Oct. 29, 2009", 2 pgs.

* cited by examiner

*Primary Examiner* — Paul N Dickson
*Assistant Examiner* — Timothy Wilhelm
(74) *Attorney, Agent, or Firm* — Schwegman Lundberg & Woessner, P.A.

(57) ABSTRACT

A control method for controlling, during a gear shifting or during a drive-away, a vehicle provided with an automatic manual transmission, the control method including the steps of: determining, in a design phase, a transmissibility function of a clutch, which provides the torque which is transmitted by clutch according to the degree of opening of clutch itself, determining an engine model in a design phase, determining a target torque which must be transmitted by means of clutch during the gear shifting or during the drive-away, controlling clutch for pursuing target torque which must be transmitted by means of clutch by using the transmissibility function, determining a target engine torque of engine according to target torque which must be transmitted by means of clutch and controlling the engine to pursue a target engine torque by using a feedforward control based on the engine model.

16 Claims, 4 Drawing Sheets

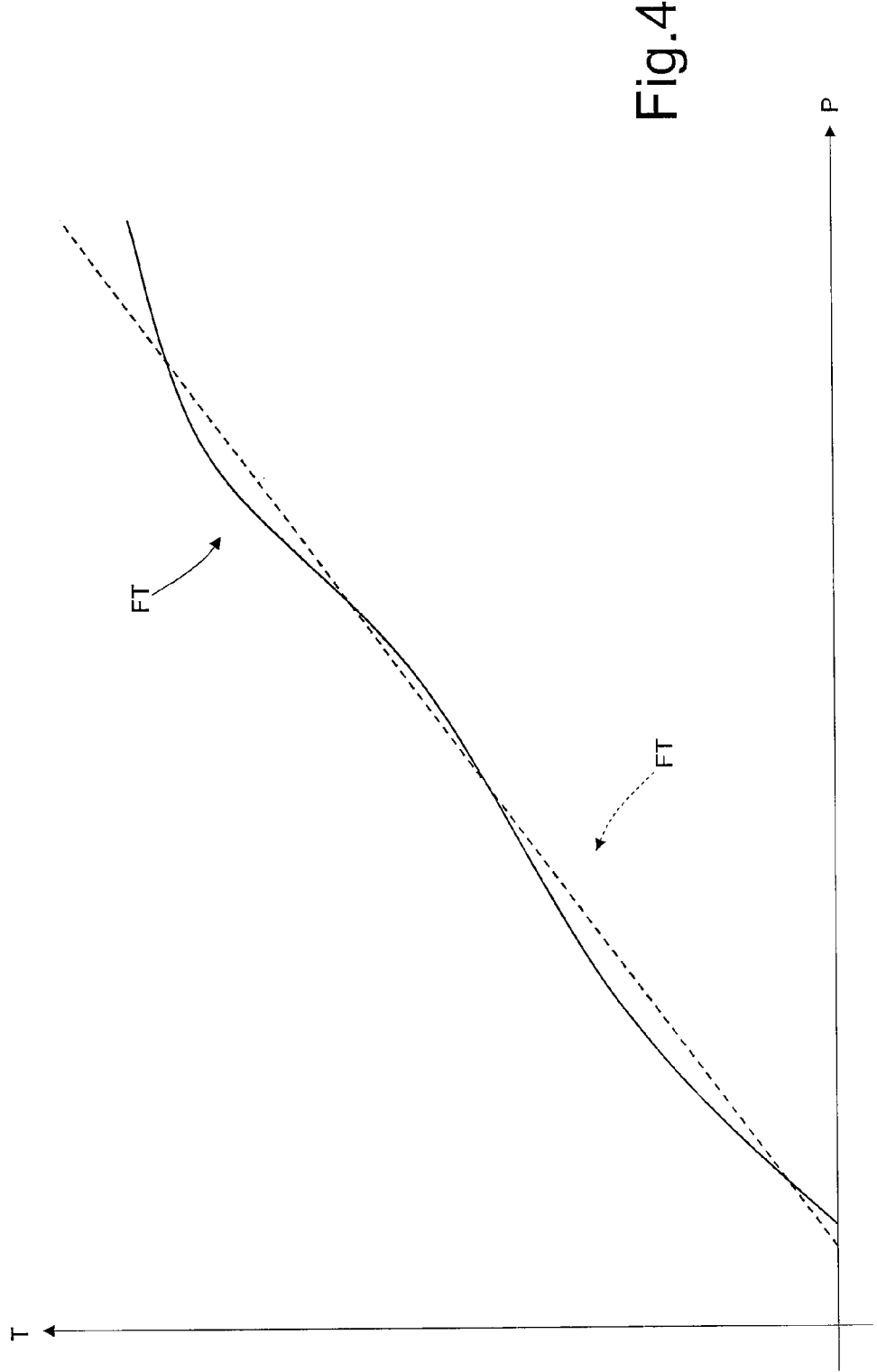

CONTROL METHOD OF A VEHICLE PROVIDED WITH AN AUTOMATIC MANUAL TRANSMISSION DURING A GEAR SHIFTING OR DURING A DRIVE-AWAY

RELATED APPLICATION

This application claims the benefit of priority, under 35 U.S.C. Section 119, to Italian Patent Application Serial No. BO2009A 000221 filed on Apr. 6, 2009 which is incorporated herein by reference in its entirety.

TECHNICAL FIELD

The present invention relates to a control method of a vehicle provided with an automatic manual transmission during a gear shifting or during a drive-away (i.e., a standing start).

BACKGROUND

Automatic manual transmissions (commonly called "AMT") are increasingly widespread: they are structurally similar to a traditional manual transmission except that the clutch pedal and the gear selector lever operated by the user are replaced by corresponding electric or hydraulic servo-controls.

An automatic manual transmission is provided with a transmission control unit which drives the servo-controls associated with clutch and gearbox during a gear shifting or during a drive-away; moreover, during a gear shifting or during a drive-away, the transmission control unit communicates with an engine control unit for making an appropriate adjustment of the engine torque delivered by the engine so as to adjust the engine operation according to the change in gear ratio and avoid a temporary undesired increase/decrease of the engine rpm when the clutch is open or however in opening or closure. Such a control mode applies both to a traditional single-clutch gearbox and a twin-clutch gearbox; the only difference between the two gearbox types is that during a gear shifting in a single-clutch gearbox there is also a central time slot in which the clutch is fully open (i.e., the engine idles with no load) while in a twin-clutch gearbox the two clutches cross and therefore there is a situation of opening/closure of the clutch throughout the gear shifting.

In a design phase, an engine model is determined which allows to predict the engine behaviour and therefore allows to determine how to control the engine in order to get the generation of a desired engine torque. Moreover, in a design phase, a transmission model is determined which requires the knowledge of the function of clutch transmissibility, which provides the torque which is transmitted by the clutch according to the degree of opening (i.e., the position in case of a position control in a dry clutch or the hydraulic pressure in case of a pressure control in a clutch in oil bath) of the clutch itself.

In the known automatic manual transmissions currently marketed, during the gear shifting or during the drive-away, the transmission control unit determines a target torque which must be transmitted by means of the clutch and a target rotation speed of the drive shaft according to the desired evolution of the gear shifting or the drive-away; in other words, the desired evolution of the gear shifting or the drive-away is described by a target speed and a target longitudinal acceleration, and such target speed and longitudinal acceleration may determine a target torque which must be transmitted by means of the clutch and a target rotation speed of the drive shaft.

By knowing the target torque which must be transmitted by means of the clutch as a start up, the transmission control unit uses the transmissibility function of the clutch for determining how to control the clutch actuator so as to pursue such target torque. Moreover, the transmission control unit communicates to the engine control unit a target torque which must be generated by the engine according to the target torque which must be transmitted by means of the clutch; the engine control unit uses the engine model for determining how to control the engine so as to pursue the target torque which must be generated by the engine.

However, both the transmissibility function of the clutch and the engine model are relatively inaccurate; specifically, both models are affected by the errors due to aging of the components, the errors due to the dispersion of the characteristics of the components, and the inevitable errors inherent in the model. Moreover, many external factors may affect the transmission of the torque by means of the clutch, and especially the generation of the engine torque, more or less randomly and unpredictably.

Because of the inaccuracies in the transmissibility function of the clutch and the engine model, the control of the torque may be inaccurate and therefore more or less significant offsets may occur between the torque actually generated by the engine and the torque actually transmitted by the clutch; such offsets determine undesired variations (temporary increases or decreases) of the engine rotation speed which are particularly bothersome as they are clearly felt by the driver (and by possible passengers) both acoustically when hearing the noise generated by the engine and physically as they may cause discontinuities (i.e., pulse variations) in the longitudinal acceleration of the vehicle. Consequently, the undesired variations in the engine rotation speed transmit to the driver (and the possible passengers) the feeling that the automatic manual transmission does not operate properly or however efficiently.

The above-described undesired variations in the engine rotation speed during a gear shifting or during a drive-away may be mitigated by means of a feedback control on the engine rotation speed; in other words, a PID controller is used which modifies the torque generated by the engine to try and remove a speed mistake, i.e., an offset between the actual engine rotation speed and the desired engine rotation speed. However, the PID controller is not able to completely remove undesired variations in the engine rotation speed, specifically when the variations are significant. Moreover, the PID controller may introduce oscillations in the engine rotation speed (which tends to oscillate around the desired value) and may introduce delays which degrade the overall dynamics of the control of the gearshift or the drive-away.

The undesired variations of the engine rotation speed during a gear shifting or during the drive-away are very mitigated and therefore less noticeable in small-medium capacity (i.e., power) engines having a fairly high mechanical inertia, but are very amplified and therefore very evident in high-performance sport engines which have a high capacity (i.e., power) combined with a very low mechanical inertia. Consequently, the need for minimizing as much as possible the undesired variations in the engine rotation speed during a gear shifting or during a drive-away is considerably felt in the high-performance sport engines, while it is less important in the small-medium capacity engines.

FR2854848A1 describes an adaptive control device for coupling an engine to a gearbox in a vehicle. The control device comprises a module for monitoring and transmission, a module for controlling the torque of a clutch, and a module for controlling a clutch actuator; the module for controlling the clutch actuator comprises correcting means which determine a signal for controlling the actuator which allows the variation between a nominal value and a measure of a physical quantity for controlling the clutch, and adjusting means for adjusting parameters of the correcting means in accordance with quantities of the physical environment and in accordance with the current actuator behaviour.

Overview

Examples described here provide a control method of a vehicle provided with an automatic manual transmission during a gear shifting or during a drive-away, which control method is free from the above-described drawbacks and is simultaneously both easy and cost-effective to be implemented.

According to some examples, there is provided a control method of a vehicle provided with an automatic manual transmission during a gear shifting or during a second drive-away as claimed in the attached claims.

BRIEF DESCRIPTION OF THE DRAWINGS

The present invention will now be described with reference to the accompanying drawings, which illustrate an exemplary and non-limitative embodiment thereof, in which:

FIG. 4 is a chart showing an example of a transmissibility function of a clutch of the twin-clutch gearbox.

DETAILED DESCRIPTION

Figure 1:
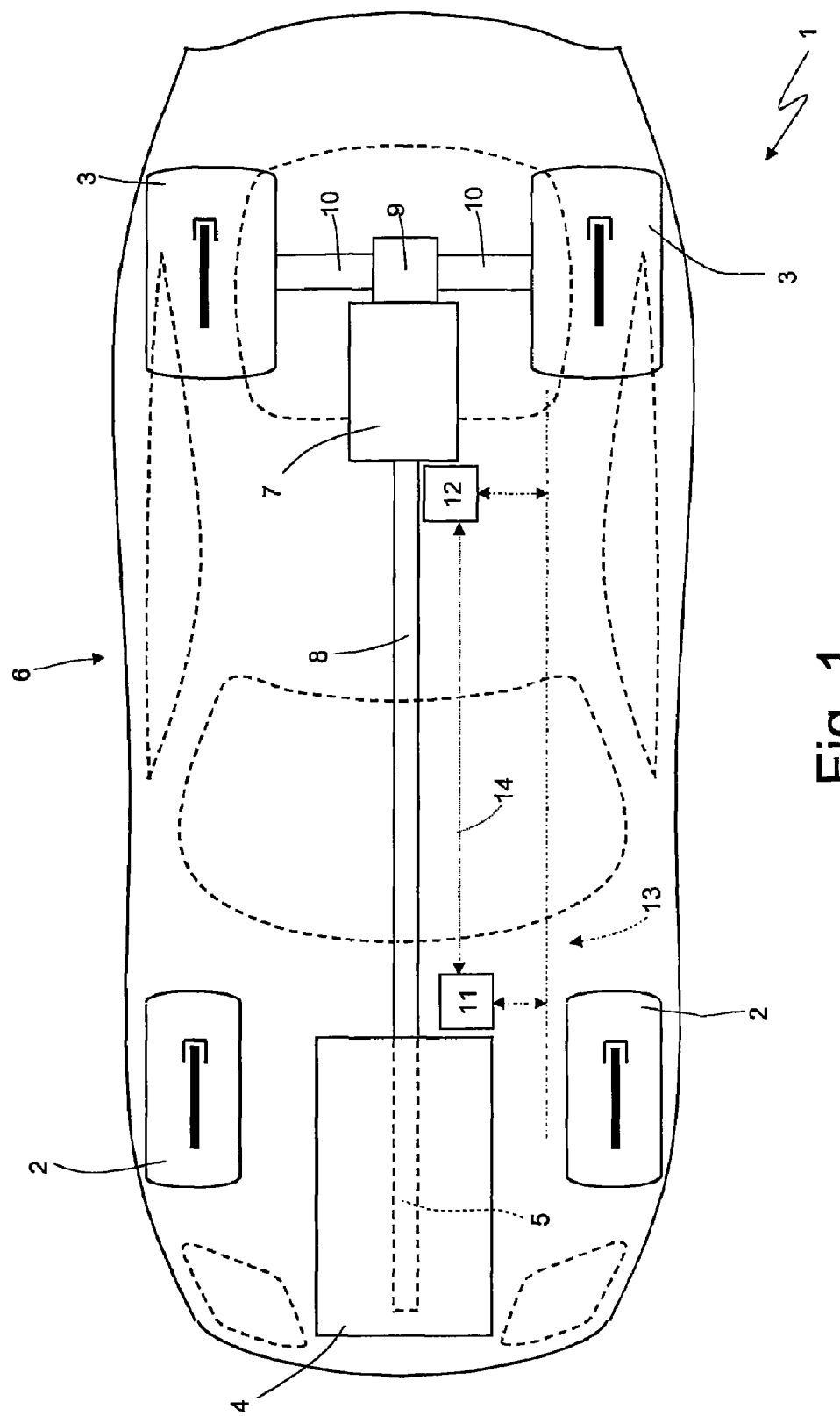
FIG. 1 is a schematic and plan view of a rear wheel drive vehicle provided with an automatic manual transmission which is controlled according to an example control method.

In FIG. 1, number 1 indicates as a whole a vehicle (specifically, a car) provided with two front wheels 2 and two rear driving wheels 3; an internal combustion engine 4 is arranged in rear position and provided with a drive shaft 5, and produces an engine torque which is transmitted to rear driving wheels 3 through an automatic manual transmission 6. Transmission 6 comprises a twin-clutch gearbox 7 arranged in rear position and a drive shaft 8 which connects drive shaft 5 to an input of gearbox 7. A self-locking differential 9, from which a pair of differential shafts 10 exit (each of which is integral with a rear driving wheel 3) is connected in cascade to gearbox 7.

Vehicle 1 comprises a control unit 11 of engine 4 which monitors the control of engine 4, a control unit 12 of transmission 6 which monitors the control of transmission 6, and a BUS line 13 which is made according to the CAN (Car Area Network) protocol, is extended to the whole vehicle 1 and allows control units 11 and 12 to communicate with each other. In other words, control unit 11 of engine 4 and control unit 12 of transmission 6 are connected to BUS line 13 and may therefore communicate with each other by means of messages sent over BUS line 13 itself. Moreover, control unit 11 of engine 4 and control unit 12 of transmission 6 may be directly connected to each other by means of a dedicated synchronization cable 14 which is able to directly transmit a signal without the delays introduced by BUS line 13 from control unit 12 of transmission 6 to control unit 11 of engine 4.

Figure 2:
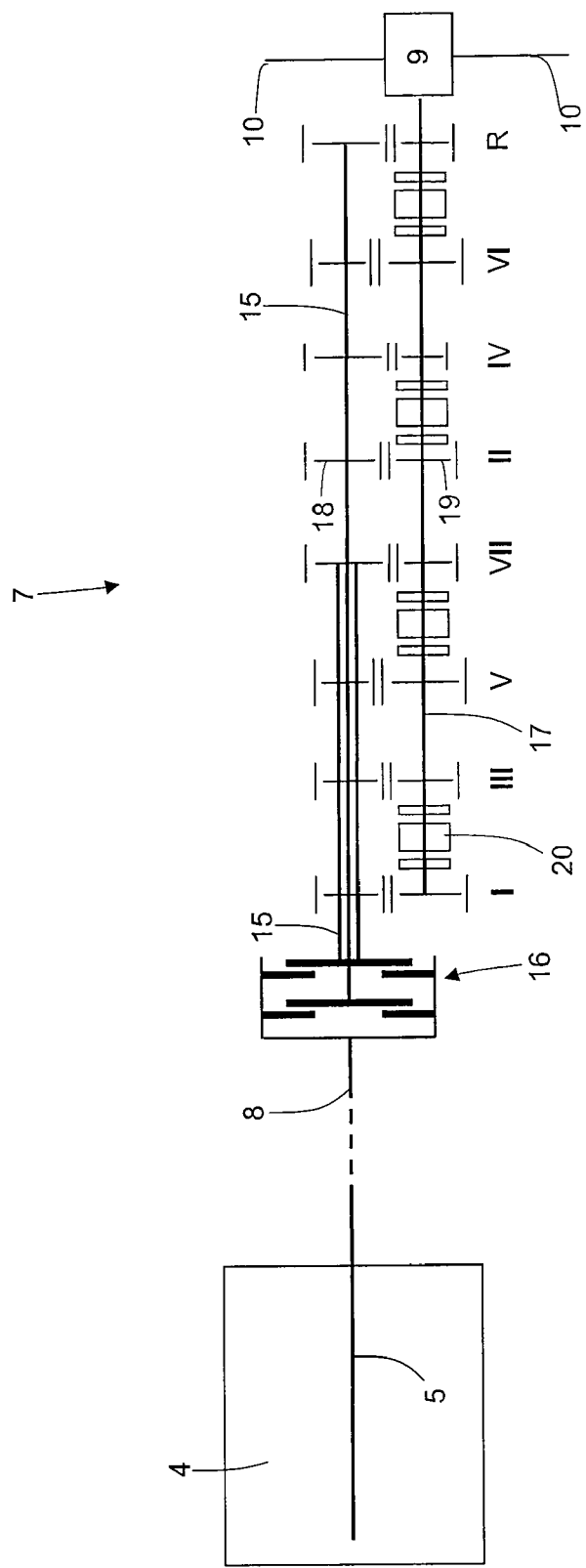
FIG. 2 is a schematic view of the automatic manual transmission in FIG. 1 provided with a twin-clutch gearbox.

As shown in FIG. 2, twin-clutch gearbox 7 comprises a pair of primary shafts 15 coaxial with each other, independent and fitted within each other. Moreover, twin-clutch gearbox 7 comprises two coaxial clutches 16, each of which is adapted to connect a corresponding primary shaft 15 to drive shaft 5 of internal combustion engine 4 by means of interposition of the drive shaft 8. Twin-clutch gearbox 7 comprises a single secondary shaft 17 connected to differential 9 which transmits the motion to the rear driving wheels 3; according to an alternative and equivalent embodiment, twin-clutch gearbox 7 comprises two secondary shafts 17 both connected to differential 9.

Twin-clutch gearbox 7 has seven forward gears indicated by Roman numerals (first gear I, second gear II, third gear III, fourth gear IV, fifth gear V, sixth gear VI and seventh gear VII) and a reverse gear (indicated by letter R). Primary shaft 15 and secondary shaft 17 are mechanically coupled to each other by means of a plurality of pairs of clusters, each of which defines a corresponding gear and comprises a primary cluster 18 fitted on primary shaft 15 and a secondary cluster 19 fitted on secondary shaft 17. In order to enable the proper operation of twin-clutch gearbox 7, all odd gears (first gear I, third gear III, fifth gear V, seventh gear VII) are coupled to the same primary shaft 15, while all even gears (second gear II, fourth gear IV and sixth gear VI) are coupled to the other primary shaft 15.

Each primary cluster 18 is keyed to a corresponding primary shaft 15 for rotating always integrally with primary shaft 15 itself and permanently meshes with corresponding secondary cluster 19; on the contrary, each secondary cluster 19 is idly fitted on secondary shaft 17. Moreover, twin-clutch gearbox 7 comprises four double synchronizers 20, each of which is fitted coaxially with respect to secondary shaft 17, is arranged between two secondary clusters 19, and is adapted to be operated to alternatively engage the two corresponding secondary gears 19 with secondary shaft 17 (i.e., to alternatively make the two corresponding secondary clusters 19 angularly integral with secondary shaft 17). In other words, each synchronizer 20 may be moved towards a direction for engaging a secondary cluster 19 with secondary shaft 17, or it may be moved towards another direction for engaging the other secondary cluster 19 with secondary shaft 17.

The modes for performing a gear shifting from a current gear A to a subsequent gear B will be described below. For the sake of simplicity, a forward gear shifting during the gear progression will be described, so that actual gear A has a higher gear ratio than subsequent gear B.

In an initial situation (i.e., before the gear shifting), a clutch 16A is closed for transmitting the motion to a primary shaft 15A which in turn transmits the motion to secondary shaft 17 by means of gear A which is currently engaged; on the contrary, a clutch 16B is open and therefore isolates a primary shaft 15B from drive shaft 8. Before starting the forward gear shifting, subsequent gear B is engaged for connecting primary shaft 15B to secondary shaft 17 by means of gear B itself; such operation is performed automatically irrespective of the driver wishes as soon as clutch 16B is opened at the end of the previous gear shifting. When the driver sends the command of gear shifting, a gear shifting is performed by opening clutch 16A for disconnecting primary shaft 15A (consequently, gear A) from drive shaft 8 (i.e., from drive shaft 5 of engine 4) and simultaneously closing clutch 16B for connecting primary shaft 15B (consequently, gear B) to drive shaft 8 (i.e., to drive shaft 5 of engine 4).

Figure 3:
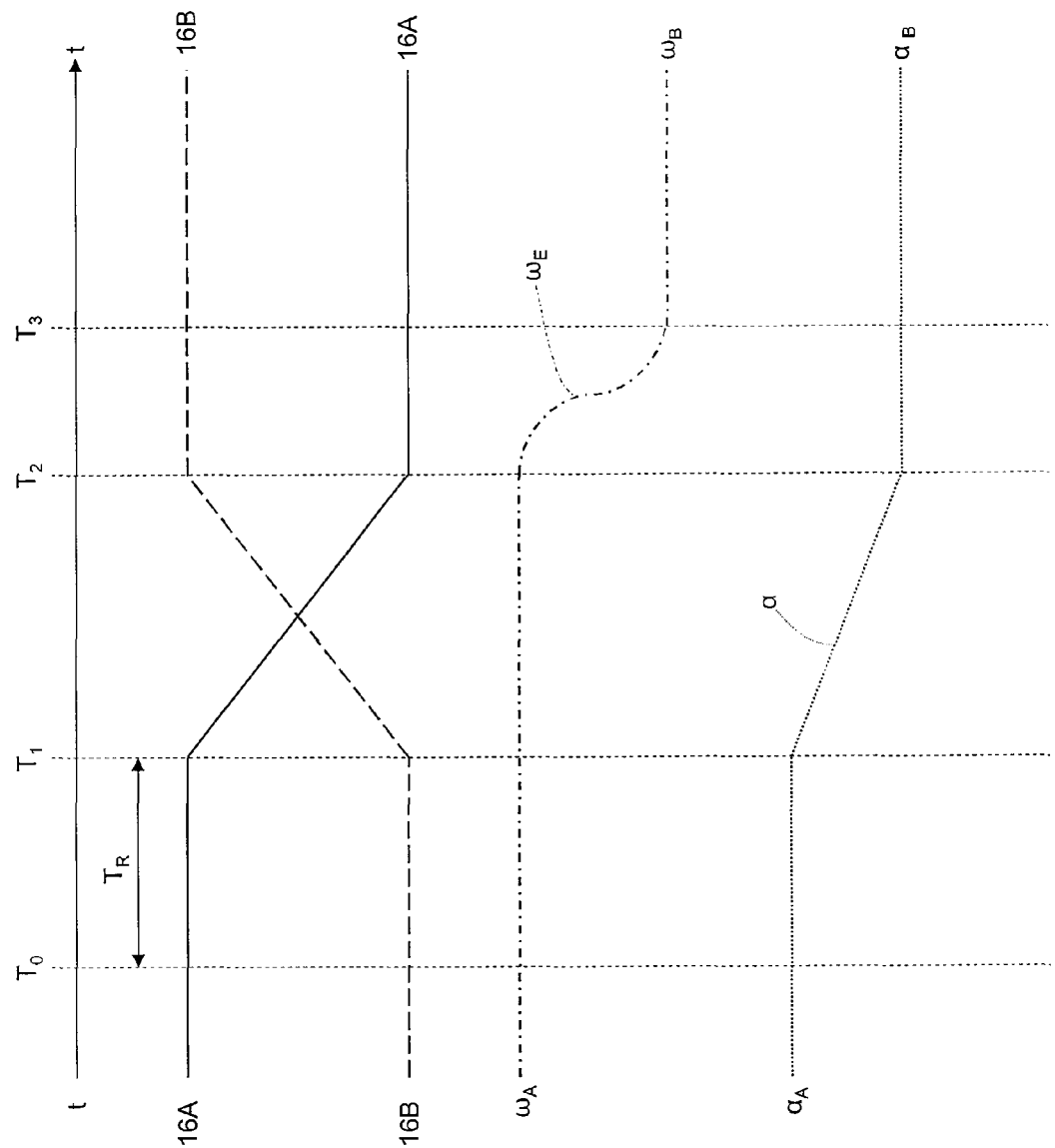
FIG. 3 shows the evolution in time of the torques transmitted by the two clutches of the twin-clutch gearbox, the rotation speed of a drive shaft of the engine, and the longitudinal acceleration of the vehicle during a gear shifting.

The above-described modes for gear shifting are schematically illustrated in FIG. 3, when the command of gear shifting is generated at instant $T_0$. As soon as transmission control unit 12 receives the command of gear shifting (instant $T_0$), transmission control unit 12 immediately starts closing clutch 16B associated with subsequent gear B; however, before clutch 16B associated with subsequent gear B starts transmitting a torque to rear driving wheels 3 it is necessary to wait for a certain filling time slot $T_R$ (typically between 100 and 250 milliseconds) during which oil filling into clutch 16B is completed.

From instant $T_0$ when transmission control unit 12 immediately starts closing clutch 16B at instant $T_1$ when clutch 16B is filled with oil after filling time $T_R$ and is ready to start transmitting a torque, nothing happens to the dynamics of vehicle 1, i.e., the entire engine torque generated by engine 4 is transmitted by clutch 16A as before the start of gear shifting. The opening of clutch 16A is controlled at instant $T_1$; it is worth noting that the opening of clutch 16A associated with current gear A occurs with no delays, as clutch 16A is already filled with oil under pressure and at this step it must only be emptied of part of the oil.

The transfer of torque between the two clutches 16 occurs between instants $T_1$ and $T_2$, i.e., the torque transmitted by clutch 16A gradually decreases and at the same time the torque transmitted by clutch 16B gradually increases, thus causing a crossing between the two clutches 16. Preferably, clutch 16A is opened simultaneously with the complete closure of clutch 16B so as to achieve a symmetric crossing allowing to keep the overall torque transmitted to rear driving wheels 3 (and therefore the torque generated by engine 4) constant. At instant $T_2$, clutch 16A is fully open (therefore no longer transmitting a torque) while clutch 16B is completely closed (therefore transmitting the entire engine torque).

The rotation speed $\omega_E$ of drive shaft 5 of engine 4 is equal to the rotation speed $\omega_A$ imposed by the gear ratio of current gear A before gear shifting, progressively decreases towards the rotation speed $\omega_B$ imposed by the gear ratio of subsequent gear B during gear shifting, and is equal to the rotation speed $\omega_E$ after gear shifting. As shown in FIG. 3, until instant $T_2$ when clutch 16A is fully open, the rotation speed $\omega_E$ of drive shaft 5 is kept constant and equal to the rotation speed $\omega_A$ and is therefore decreased only after clutch 16A is fully open; such control method of the rotation speed $\omega_E$ of drive shaft 5 aims at preventing clutch 16A from becoming braking, i.e., generating a braking couple to rear driving wheels 3. In order to decrease the rotation speed $\omega_E$ of drive shaft 5 of engine 4 after the complete opening of clutch 16A, control unit 11 of engine 4 temporarily decreases the engine torque generated by engine 4 itself, upon suggestion from control unit 12 of transmission 6; such temporary decrease in the engine torque generated by engine 4 has the effect of decreasing the rotation speed $\omega_E$ of drive shaft 5 which passes from the initial value $\omega_A$ imposed by the gear ratio of current gear A to the final value $\omega_E$ imposed by the gear ratio of subsequent gear B. In other words, both the mechanical power generated by engine 4 and part of the kinetic energy owned by drive shaft 5 (which slows down as a consequence) are transferred to rear driving wheels 3 for a short period. It is worth noting that the temporary decrease in engine torque $T_E$ generated by engine 4 has no effect on longitudinal acceleration a of vehicle 1, as the torque transmitted by clutch 16B to the rear driving wheels 3 remains constant.

Longitudinal acceleration a of vehicle 1 is in first approximation constant and equal to value $\alpha_A$ immediately before gear shifting, gradually decreases towards value $\alpha_B$ during gear shifting, and is in first approximation constant and equal to value $\alpha_B$ immediately after gear shifting. The decrease of longitudinal acceleration α of vehicle 1 during gear shifting is due to the fact that the engine torque generated by engine 4 remaining fairly constant is transmitted with a gradually decreasing gear ratio (gear A is shorter than gear B) and therefore a gradually decreasing torque is applied to rear driving wheels 3.

The above-described modes for performing a gear shifting are partly used also for a drive-away, i.e., for a standing start in which a clutch 16 is gradually closed (while the other clutch 16 remains open) for engaging a gear (typically first gear I associated with clutch 16A, but also second gear II associated with clutch 16B, e.g. when the road surface is considerably slippery). In essence, during a drive-away, clutch 16 associated with the gear to be engaged for a standing start is closed as described above, while the other clutch 16 remains open.

In a design phase, a model of transmission 6 is determined which provides knowledge of the transmissibility function FT of each clutch 16, which provides a torque which is transmitted by clutch 16 according to the degree of opening (i.e., the hydraulic pressure when clutch 16 is hydraulic or the position if clutch 16 is dry) of clutch 16 itself. An example of a transmissibility function FT of a clutch 16 is shown in FIG. 4 which shows hydraulic pressure P within clutch 16 on the x-axis and shows torque T transmitted by clutch 16 on the y-axis; specifically, the figure shows in dashed lines a standard transmissibility function FT and shows in solid lines an updated transmissibility function FT in accordance with the present invention and as described below. The transmissibility functions FT of the two clutches 16 are stored in a memory of control unit 12 of transmission 6 and are used by control unit 12 for translating a target torque in a corresponding target pressure (or position in the case of dry clutches 16) by which the actuators of the clutches 16 may be controlled.

Moreover, in a design phase, an engine model 4 is determined which allows to predict the behaviour of engine 4 and therefore allows to determine how to control engine 4 for obtaining the generation of a desired engine torque. Engine model 4 is stored in a memory of unit control 11 of engine 4 and used by control unit 11 to determine how to control engine 4 in a feedforward manner for pursuing a target torque.

Before starting a gear shifting or a drive-away, control unit 12 of transmission 6 determines a target torque $T_{C-TAR}$ which must be transmitted by means of the clutches 16 and a target rotation speed $\omega_{E-TAR}$ of drive shaft 5 of engine 4 according to the desired evolution of the gear shifting or the drive-away; in other words, the desired evolution of the gear shifting or the drive-away is described by a target speed during the gear shifting or during the drive-away and, by means of such target speed and longitudinal acceleration, it is possible to determine a target torque $T_{C-TAR}$ which must be transmitted through clutches 16 and a target speed rotation $\omega_{E-TAR}$ of drive shaft 5a. Moreover, control unit 12 of transmission 6 determines a target engine torque $T_{E-TAR}$, which must be generated by engine 4 according to target torque $T_{C-TAR}$ which must be transmitted by means of clutches 16, and transmits it to control unit 11 of engine 4.

During the gear shifting or during the drive-away, control unit 12 of transmission 6 uses the transmissibility functions FT to determine how to control the hydraulic pressure of the clutches 16 so as to pursue with a feedforward control the target torque $T_{C-TAR}$ which must be transmitted by means of the clutches 16. Moreover, during the gear shifting or during the drive-away, control unit 11 of engine 4 uses engine model 4 for determining how to control engine 4 so as to pursue with a feedforward control the target engine torque $T_{E\text{-}TAR}$ which must be generated by engine 4.

When at least one clutch 16 is operated in opening or closure, control unit 12 of transmission 6 receives from control unit 11 of engine 4 an estimation of engine torque $T_E$ generated by engine 4 and made by means of engine model 4 and a measure of the rotation speed $\omega_E$ of drive shaft 5; therefore, control unit 12 calculates a torque $T_C$ transmitted by the clutches 16 by applying the following equation:

$$T_C = T_E - J_E * d\omega_E/dt$$

$T_C$ torque transmitted by the clutches 16;
$T_E$ engine torque generated by engine 4;
$J_E$ moment of inertia of drive shaft 5;
$d\omega_E/dt$ first derivative in time of the rotation speed $\omega_E$ of drive shaft 5.

According to certain examples, the rotation speed $\omega_E$ of drive shaft 5 or the first derivative $d\omega_E/dt$ in time of the rotation speed $\omega_E$ of drive shaft 5 are subjected to a low-pass filtering for removing the high frequency noises. In other words, the first derivative $d\omega_E/dt$ in time of the rotation speed $\omega_E$ of drive shaft 5 is a "dirty" signal which normally requires a low-pass filtering.

Preferably, besides filtering with a low-pass filter the rotation speed $\omega_E$ of drive shaft 5 or the first derivative $d\omega_E/dt$ in time of the rotation speed $\omega_E$ of drive shaft 5, control unit 12 also applies the same type of low-pass filter to the engine torque $T_E$, generated by engine 4 and estimated by engine model 4, and to torque $T_C$ transmitted by the clutches 16 resulting from the original transmissibility functions FT. By subjecting all the involved quantities to the same low-pass filtering, it is possible to recover the phase error (i.e., the delay) inherent of an algorithm of the low-pass filtering which must operate in real time; in other words, by subjecting all involved quantities to the same type of low-pass filtering, all involved quantities have the same phase error and are therefore perfectly in phase with each other.

Control unit 12 updates the transmissibility function FT of each clutch 16 by using torque $T_C$ transmitted by clutch 16 determined according to the estimation of engine torque $T_E$ generated by engine 4, i.e., torque $T_C$ transmitted by the clutches 16 according to the "viewpoint" of engine model 4 used by control unit 11 of engine 4.

According to a preferred embodiment, in order to calculate torque $T_C$ transmitted from clutch 16 to engine torque $T_E$ generated by engine 4, a pumping torque absorbed by the oil pump of a hydraulic circuit of the clutches 16 is removed; such pumping torque is determined in a design phase and is generally variable with the variation of rotation speed $\omega_E$ of drive shaft 5. Moreover, engine torque $T_E$ generated by engine 4 is also deprived of all the torques absorbed by the auxiliary services of vehicle 1 such as e.g. the air-conditioning compressor, the alternator that feeds the electric loads of vehicle 1, and the reversible electric machine responsible for the electric traction in the case of hybrid vehicle 1.

In order to update the transmissibility function FT of each clutch 16, control unit 12 tries to use only the moments in which a clutch 16 is fully open and therefore substantially the entire torque $T_C$ transmitted by the clutches 16 is transmitted by the other clutch 16 (a clutch 16 in oil bath has never null torque and transmits a parasite torque due to the presence of oil between the discs of clutch 16 itself, even when it is fully open; however, such parasite torque is negligible and known a priori and is therefore relatively easy to be taken into account). Consequently, in order to update the transmissibility function FT of each clutch 16, control unit 12 mainly uses the drives-away, in which a clutch 16 is always open. However, most of the drives-away (i.e., the standing starts) requires engaging first gear I associated with clutch 16A, so that updating transmissibility function FT of clutch 16B may be problematic (i.e., less reliable as the statistical methods require a number of data in order to substantially reduce the accidental errors); in order to obviate such a drawback, control unit 12 of transmission control 6 may perform a number of drives-away by engaging second gear II associated with clutch 16B instead of first gear I associated with clutch 16A only in order to have a higher number of data on the transmissibility function FT of clutch 16B (obviously only in case of comfortable drive without any search for performance).

According to an alternative embodiment, when both clutches 16 are simultaneously partially open/closed, dividing torque $T_C$ transmitted by clutch 16 between the two clutches 16 themselves would be theoretically possible, but the division of torque $T_C$ transmitted by clutch 16 in order to obtain the torque transmitted by each clutch 16 is generally not performed due to the high number of errors inherent in such a subdivision. In order to perform such a subdivision, control unit 12 may use the transmissibility functions FT of the two clutches 16 for determining a proportion between the torques transmitted by each clutch and therefore applying this proportion to torque $T_C$ transmitted by clutch 16 determined according to the estimation of engine torque $T_E$ generated by engine 4. In other words, according to the corresponding degree of opening, control unit 12 determines the torques transmitted by the clutches 16 which are provided by the corresponding transmissibility functions FT and therefore determines the proportion between the torques transmitted by each clutch 16 by performing a proportion between these torques.

According to a possible embodiment, control unit 12 determines a correction coefficient K according to the ratio between torque $T_C$ transmitted by a clutch 16 determined according to the estimation of engine torque $T_E$ generated by engine 4 and a corresponding torque transmitted by clutch 16 provided by the original transmissibility function FT determined at the design phase (shown in dotted lines in FIG. 4); once the correction coefficient K was determined, control unit 12 uses correction coefficient K for correcting a torque transmitted by each clutch 16 provided by the corresponding transmissibility function FT. Preferably, correction coefficient K is a function of the degree of opening of each clutch 16, as several experimental tests have shown that correction coefficient K has a non-negligible variability with the variation of the degree of opening of clutch 16.

In order to reduce the incidence of the accidental errors, control unit 12 determines, for each degree of opening of each clutch 16, a plurality of correction coefficients K, and statistically processes (e.g., by means of weighted averages) the plurality of correction coefficients K for each degree of opening of each clutch 16.

Preferably, control unit 12 discards (i.e., does not consider) a torque $T_C$ transmitted by a clutch 16 determined according to the estimation of engine torque $T_E$ generated by engine 4 when such torque $T_C$ transmitted by clutch 16 makes the transmissibility function FT locally non-increasing with the increase in oil pressure (or the position in case of dry clutch 16). In other words, it is assumed that the transmissibility function FT should be always increasing and therefore not considering (i.e., refusing) an estimation of torque $T_C$ transmitted by a clutch 16 (or better a correction coefficient K obtained from such estimation of torque $T_C$ transmitted by a clutch 16) which makes the transmissibility function FT locally non-increasing.

Preferably, control unit 12 discards (i.e., does not consider) a torque $T_C$ transmitted by a clutch 16 determined according to the estimation of engine torque $T_E$ generated by engine 4 when the difference between such torque $T_C$ transmitted by clutch 16 and a corresponding torque transmitted by clutch 16 provided by the transmissibility function FT is too high. In other words, it is assumed that the difference between a torque $T_C$ transmitted by clutch 16 determined according to the estimation of engine torque $T_E$ generated by engine 4 and a corresponding torque transmitted by clutch 16 provided by the transmissibility function FT must be lower than a threshold of acceptability (typically expressed in percentage); alternatively, a correction coefficient K is acceptable only when it is within a predetermined range of acceptability.

Preferably, control unit 12 does not update the transmissibility function FT using the torque $T_C$ transmitted by clutch 16 determined according to the estimation of engine torque $T_E$ generated by engine 4 in the presence of violent transitions of rotation speed $\omega_E$ of drive shaft 5 (i.e., when rotation speed $\omega_E$ of drive shaft 5 significantly changes in the short term, i.e. with a high angular acceleration), as the low-pass filtering which is performed on rotation speed $\omega_E$ of drive shaft 5 or on the first derivative $d\omega_E/dt$ in time of rotation speed $\omega_E$ of drive shaft 5 may result in a loss of "useful" information. In other words, in case of violent transitions of rotation speed $\omega_E$ of drive shaft 5, part of the "useful" signal contained in the first derivative $d\omega_E/dt$ in time of rotation speed $\omega_E$ of drive shaft 5 occurs at high frequencies typical of the noises and is therefore removed by the low-pass filtering; therefore, control unit 12 discards the information obtained at violent transitions of rotation speed $\omega_E$ of drive shaft 5.

Control unit 12 updates the transmissibility function FT using the torque $T_C$ transmitted by the clutches 16 determined according to the estimation of engine torque $T_E$ generated by engine 4 only under certain operating conditions of engine 4 and/or transmission 6, i.e. as much likely as that the estimation of engine torque $T_E$ generated by engine 4 is reliable. Specifically, control unit 12 updates the transmissibility function FT by using torque $T_C$ transmitted by the clutches 16 determined according to the estimation of engine torque $T_E$ generated by engine 4 only when engine 4 and/or transmission 6 have reached a minimum operating temperature and/or reached a stable operating temperature (specifically, engine model 4 is very responsive to the cooling temperature).

According to a not shown alternative embodiment, 7 is a single clutch gearbox and therefore comprises a single clutch 16 and a single primary shaft 15; even in this case, the above-described control method is fully usable and indeed finds a simpler application as it has a single clutch 16 and therefore a single transmissibility function FT.

As described above, the transmissibility function FT of each clutch 16 is updated (i.e., corrected) according to the "viewpoint" of engine model 4 according to a "master-slave" logic; in other words, engine model 4 is considered as a "master" (i.e., dominant) and therefore the transmissibility functions FT of the clutches 16 which are therefore considered as a "slave" (i.e., slaved) are adjusted according to engine model 4. Such control mode assumes that it is not necessary that engine model 4 and the transmissibility function FT of the clutches 16 are perfect (ideal, but practically not accessible condition), but it will suffice that engine model 4 and the transmissibility function FT of the clutches 16 are "wrong" in the same way; i.e., it is not necessary that engine model 4 and the transmissibility function FT of the clutches 16 tell the truth, but it will suffice that engine model 4 and the transmissibility function FT of the clutches 16 tell the same lie. For example, if under certain conditions engine model 4 underestimates engine torque $T_E$ generated by engine 4 (and therefore the engine generates an engine torque $T_E$ higher than target engine torque $T_{E-TAR}$ which must be generated by engine 4) then the transmissibility functions FT of the clutches 16 should also underestimate the torque transmitted by the clutches (therefore, the clutches 16 transmit a torque higher than torque target $T_{C-TAR}$ which must be transmitted by means of the clutches 16); in this manner, the excess engine torque $T_E$ generated by engine 4 determines no discontinuity in longitudinal acceleration a of vehicle 1 and therefore is not felt by the passengers of vehicle 1.

Briefly, the worst condition occurs when engine model 4 gets wrong opposite with respect to the transmissibility function FT of the clutches 16, because the errors sum up, thus amplifying their effect. In order to avert this risk, and indeed to try and always ensure that the errors reciprocally eliminate, thus eliminating their effect, according to the present invention the transmissibility functions FT of the clutches 16 are updated (corrected) according to the "viewpoint" of engine model 4, such that the transmissibility functions FT of the clutches 16 fit engine model 4 by having errors (inaccuracies) equal (i.e., of the same type) to the errors (inaccuracies) of engine model 4.

It is worth noting that when the feedforward controls are efficient and effective (which is made possible by the fact that the transmissibility functions FT of the clutches 16 fit engine model 4 by having inaccuracies which compensate for the inaccuracies in engine model 4), the intervention of the closed-loop control which "monitors" the rotation speed $\omega_E$ of drive shaft 5 is absent or however limited, with a remarkable improvement of the overall dynamics of the control of the gear shifting or the drive-away.

In conclusion, the above-described control method has many advantages. Firstly, the above-described control method allows to remove or however significantly reduce the discontinuities in longitudinal acceleration α of vehicle 1 during a gear shifting or during a drive-away, as it allows to compensate for the inaccuracies of engine model 4 with similar inaccuracies in the transmissibility functions FT of the clutches 16. Secondly, the above-described control method is of a simple and cost-effective implementation, as it does not require the installation of additional physical components and does not involve an enhancing of control unit 11 of engine 4 or control unit 12 of transmission 6 as it does not require significant additional computing power.

We claim:

1. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:

determining, during a design phase, a nominal transmissibility function (FT) of the clutch, which provides the torque delivered by the clutch according to the degree of opening of the clutch;

determining, during a design phase, a model of the engine;

determining a target torque ($T_{C-TAR}$) for transmission through the clutch during the gear shifting or during the drive-away;

making the clutch pursue the target torque ($T_{C-TAR}$) that has to be transmitted through the clutch by using the transmissibility function (FT);

determining a target engine torque ($T_{E\text{-}TAR}$) of the engine according to the target torque ($T_{C\text{-}TAR}$) for transmission through the clutch;

making the engine pursue the target engine torque ($T_{E\text{-}TAR}$) of the engine by using a feedforward control based on the model of the engine;

estimating, when the clutch is operated in opening or closure, a torque ($T_E$) delivered by the engine through the model of the engine;

measuring, when the clutch is operated in opening or closure, a rotation speed ($\omega_E$) of the drive shaft and calculating a first derivative in time of the rotation speed ($\omega_E$) of the drive shaft;

low-pass filtering the rotation speed ($\omega_E$) of the drive shaft or the first derivative in time of the rotation speed ($\omega_E$) of the drive shaft;

calculating, when the clutch is operated in opening or closure, a torque ($T_C$) transmitted by the clutch by applying the following equation:

$$T_C = T_E - J_E * d\omega_E/dt,$$

wherein $T_C$ represents the torque transmitted by the clutch,
wherein $T_E$ represents the torque delivered by the engine,
wherein $J_E$ represents the moment of inertia of the drive shaft, and
wherein $d\omega_E/dt$ represents the low-pass filtered first derivative in time of the rotation speed ($\omega_E$) of the drive shaft;

updating, when the clutch is operated in opening or closure, the transmissibility function (FT) of the clutch by using the torque ($T_C$) transmitted by the clutch determined according to the estimation of the torque ($T_E$) delivered by the engine, i.e. by data determined using the model of the engine which is considered as a true reference such that the transmissibility function (FT) and the model of the engine have the same type of errors; and using for the next control of the clutch the transmissibility function (FT) which has been updated having as a true reference the model of the engine.

2. Control method according to claim 1 and comprising the further steps of:

determining a correction coefficient (K) according to the ratio between the torque ($T_C$) transmitted by the clutch, determined according to the estimation of the torque ($T_E$) delivered by the engine, and a corresponding torque transmitted by the clutch, provided by the original transmissibility function (FT) determined during the design phase; and using the correction coefficient (K) to correct a torque transmitted by the clutch provided by the transmissibility function (FT).

3. Control method according to claim 2, wherein the correction coefficient (K) is a function of the degree of opening of the clutch.

4. Control method according to claim 2 and comprising the further steps of:

determining, for each degree of opening of the clutch, a plurality of correction coefficients (K); and processing statistically, for each degree of opening of the clutch, the plurality of correction coefficients (K).

5. Control method according to claim 1 and comprising the further step of rejecting a torque ($T_C$) transmitted by the clutch determined according to the estimation of the torque ($T_E$) delivered by the engine in case this torque ($T_C$) transmitted by the clutch makes the transmissibility function (FT) locally not increasing.

6. Control method according to claim 1 and comprising the further step of rejecting a torque ($T_C$) transmitted by the clutch determined according to the estimation of the torque ($T_E$) delivered by the engine in case the difference between this torque ($T_C$) transmitted by the clutch and a corresponding torque transmitted by the clutch provided by the transmissibility function (FT) is too big.

7. Control method according to claim 1 and comprising the further step of updating the transmissibility function (FT) by using the torque ($T_C$) transmitted by the clutch determined according to the estimation of the torque ($T_E$) delivered by the engine only in presence of certain working conditions of the engine and/or of the transmission.

8. Control method according to claim 7 and comprising the further step of updating the transmissibility function (FT) by using the torque ($T_C$) transmitted by the clutch determined according to the estimation of the torque ($T_E$) delivered by the engine only when the engine and/or of the transmission have reached a minimum working temperature.

9. Control method according to claim 7 and comprising the further step of updating the transmissibility function (FT) by using the torque ($T_C$) transmitted by the clutch determined according to the estimation of the torque ($T_E$) delivered by the engine only when the engine and/or the transmission have reached a stable working temperature.

10. Control method according to claim 1 and comprising the further step of applying to the torque ($T_E$) delivered by the engine estimated through the model of the engine and/or to the torque ($T_C$) transmitted by the clutches deriving from the original transmissibility function (FT) the same low-pass filter as the one applied to the rotation speed ($\omega_E$) of the drive shaft or the first derivative in time of the rotation speed ($\omega_E$) of the drive shaft.

11. Control method according to claim 1 and comprising the further step of rejecting information corresponding to violent transitions of the rotation speed ($\omega_E$) of the drive shaft.

12. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:

determining, during a design phase, a nominal transmissibility function (FT) of the clutch, which provides the torque delivered by the clutch according to the degree of opening of the clutch;

determining, during a design phase, a model of the engine;

determining a target torque ($T_{C\text{-}TAR}$) for transmission through the clutch during the gear shifting or during the drive-away;

making the clutch pursue the target torque ($T_{C\text{-}TAR}$) that has to be transmitted through the clutch by using the transmissibility function (FT);

determining a target engine torque ($T_{E\text{-}TAR}$) of the engine according to the target torque ($T_{C\text{-}TAR}$) for transmission through the clutch;

making the engine pursue the target engine torque ($T_{E\text{-}TAR}$) of the engine by using a feedforward control based on the model of the engine;

estimating, when the clutch is operated in opening or closure, a torque ($T_E$) delivered by the engine through the model of the engine;

measuring, when the clutch is operated in opening or closure, a rotation speed ($\omega_E$) of the drive shaft and calculating a first derivative in time of the rotation speed ($\omega_E$) of the drive shaft;

calculating, when the clutch is operated in opening or closure, a torque ($T_C$) transmitted by the clutch by applying the following equation:

$$T_C = T_E - J_E * d\omega_E/dt,$$

wherein $T_C$ represents the torque transmitted by the clutch,
wherein $T_E$ represents the torque delivered by the engine,
wherein $J_E$ represents the moment of inertia of the drive shaft, and
wherein $d\omega_E/dt$ represents the low-pass first derivative in time of the rotation speed ($\omega_E$) of the drive shaft;
updating, when the clutch is operated in opening or closure and only when the engine and/or of the transmission have reached a minimum working temperature, the transmissibility function (FT) of the clutch by using the torque ($T_C$) transmitted by the clutch determined according to the estimation of the torque ($T_E$) delivered by the engine, i.e. by data determined using the model of the engine which is considered as a true reference such that the transmissibility function (FT) and the model of the engine have the same type of errors; and
using for the next control of the clutch the transmissibility function (FT) which has been updated having as a true reference the model of the engine.

13. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:
determining, during a design phase, a nominal transmissibility function (FT) of the clutch, which provides the torque delivered by the clutch according to the degree of opening of the clutch;
determining, during a design phase, a model of the engine;
determining a target torque ($T_{C-TAR}$) for transmission through the clutch during the gear shifting or during the drive-away;
making the clutch pursue the target torque ($T_{C-TAR}$) that has to be transmitted through the clutch by using the transmissibility function (FT);
determining a target engine torque ($T_{E-TAR}$) of the engine according to the target torque ($T_{C-TAR}$) for transmission through the clutch;
making the engine pursue the target engine torque ($T_{E-TAR}$) of the engine by using a feedforward control based on the model of the engine;
estimating, when the clutch is operated in opening or closure, a torque ($T_E$) delivered by the engine through the model of the engine;
measuring, when the clutch is operated in opening or closure, a rotation speed ($\omega_E$) of the drive shaft and calculating a first derivative in time of the rotation speed ($\omega_E$) of the drive shaft;
calculating, when the clutch is operated in opening or closure, a torque ($T_C$) transmitted by the clutch by applying the following equation:

$$T_C = T_E - J_E * d\omega_E/dt,$$

wherein $T_C$ represents the torque transmitted by the clutch,
wherein $T_E$ represents the torque delivered by the engine,
wherein $J_E$ represents the moment of inertia of the drive shaft, and
wherein $d\omega_E/dt$ represents the low-pass first derivative in time of the rotation speed ($\omega_E$) of the drive shaft;
updating, when the clutch is operated in opening or closure and only when the engine and/or the transmission have reached a stable working temperature, the transmissibility function (FT) of the clutch by using the torque ($T_C$) transmitted by the clutch determined according to the estimation of the torque ($T_E$) delivered by the engine, i.e. by data determined using the model of the engine which is considered as a true reference such that the transmissibility function (FT) and the model of the engine have the same type of errors; and
using for the next control of the clutch the transmissibility function (FT) which has been updated having as a true reference the model of the engine.

14. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:
determining, during a design phase, a nominal transmissibility function (FT) of the clutch, which provides the torque delivered by the clutch according to the degree of opening of the clutch;
determining, during a design phase, a model of the engine;
determining a target torque ($T_{C-TAR}$) for transmission through the clutch during the gear shifting or during the drive-away;
making the clutch pursue the target torque ($T_{C-TAR}$) that has to be transmitted through the clutch by using the transmissibility function (FT);
determining a target engine torque ($T_{E-TAR}$) of the engine according to the target torque ($T_{C-TAR}$) for transmission through the clutch;
making the engine pursue the target engine torque ($T_{E-TAR}$) of the engine by using a feedforward control based on the model of the engine;
updating, when the clutch is operated in opening or closure, the transmissibility function (FT) of the clutch by data determined using the model of the engine which is considered as a true reference such that the transmissibility function (FT) and the model of the engine have the same type of errors;
using for the next control of the clutch the transmissibility function (FT) which has been updated having as a true reference the model of the engine;
determining a correction coefficient (K) according to the ratio between the torque ($T_C$) transmitted by the clutch, determined according to the estimation of the torque ($T_E$) delivered by the engine, and a corresponding torque transmitted by the clutch, provided by the original transmissibility function (FT) determined during the design phase; and
using the correction coefficient (K) to correct a torque transmitted by the clutch provided by the transmissibility function (FT);
wherein the correction coefficient (K) is a function of the degree of opening of the clutch.

15. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:

determining, during a design phase, a nominal transmissibility function (FT) of the clutch, which provides the torque delivered by the clutch according to the degree of opening of the clutch;

determining, during a design phase, a model of the engine;

determining a target torque ($T_{C\text{-}TAR}$) for transmission through the clutch during the gear shifting or during the drive-away;

making the clutch pursue the target torque ($T_{C\text{-}TAR}$) that has to be transmitted through the clutch by using the transmissibility function (FT);

determining a target engine torque ($T_{E\text{-}TAR}$) of the engine according to the target torque ($T_{C\text{-}TAR}$) for transmission through the clutch;

making the engine pursue the target engine torque ($T_{E\text{-}TAR}$) of the engine by using a feedforward control based on the model of the engine;

estimating, when the clutch is operated in opening or closure, a torque ($T_E$) delivered by the engine through the model of the engine;

measuring, when the clutch is operated in opening or closure, a rotation speed ($\omega_E$) of the drive shaft and calculating a first derivative in time of the rotation speed ($\omega_E$) of the drive shaft;

calculating, when the clutch is operated in opening or closure, a torque ($T_C$) transmitted by the clutch by applying the following equation:

$$T_C = T_E - J_E * d\omega_E/dt,$$

wherein $T_C$ represents the torque transmitted by the clutch,
wherein $T_E$ represents the torque delivered by the engine,
wherein $J_E$ represents the moment of inertia of the drive shaft, and
wherein $d\omega_E/dt$ represents the low-pass first derivative in time of the rotation speed ($\omega_E$) of the drive shaft;

rejecting a torque ($T_C$) transmitted by the clutch determined according to the estimation of the torque ($T_E$) delivered by the engine in case this torque ($T_C$) transmitted by the clutch makes the transmissibility function (FT) locally not increasing;

updating, when the clutch is operated in opening or closure, the transmissibility function (FT) of the clutch by using the torque ($T_C$) transmitted by the clutch determined according to the estimation of the torque ($T_E$) delivered by the engine, i.e. by data determined using the model of the engine which is considered as a true reference such that the transmissibility function (FT) and the model of the engine have the same type of errors; and using for the next control of the clutch the transmissibility function (FT) which has been updated having as a true reference the model of the engine.

16. Control method for of a vehicle with an automatic manual transmission, the method for controlling during a gear shifting or during a drive-away, the method for controlling an automatic manual transmission which comprises a gearbox which is provided with at least one primary shaft and at least one secondary shaft connected to driving wheels and at least one clutch, which is interposed between the primary shaft of the gearbox and a drive shaft of an engine the control, the method comprising:

determining, during a design phase, a nominal transmissibility function (FT) of the clutch, which provides the torque delivered by the clutch according to the degree of opening of the clutch;

determining, during a design phase, a model of the engine;

determining a target torque ($T_{C\text{-}TAR}$) for transmission through the clutch during the gear shifting or during the drive-away;

making the clutch pursue the target torque ($T_{C\text{-}TAR}$) that has to be transmitted through the clutch by using the transmissibility function (FT);

determining a target engine torque ($T_{E\text{-}TAR}$) of the engine according to the target torque ($T_{C\text{-}TAR}$) for transmission through the clutch;

making the engine pursue the target engine torque ($T_{E\text{-}TAR}$) of the engine by using a feedforward control based on the model of the engine;

estimating, when the clutch is operated in opening or closure, a torque ($T_E$) delivered by the engine through the model of the engine;

measuring, when the clutch is operated in opening or closure, a rotation speed ($\omega_E$) of the drive shaft and calculating a first derivative in time of the rotation speed ($\omega_E$) of the drive shaft;

calculating, when the clutch is operated in opening or closure, a torque ($T_C$) transmitted by the clutch by applying the following equation:

$$T_C = T_E - J_E * d\omega_E/dt,$$

wherein $T_C$ represents the torque transmitted by the clutch,
wherein $T_E$ represents the torque delivered by the engine,
wherein $J_E$ represents the moment of inertia of the drive shaft, and
wherein $d\omega_E/dt$ represents the low-pass first derivative in time of the rotation speed ($\omega_E$) of the drive shaft;

rejecting a torque ($T_C$) transmitted by the clutch determined according to the estimation of the torque ($T_E$) delivered by the engine in case the difference between this torque ($T_C$) transmitted by the clutch and a corresponding torque transmitted by the clutch provided by the transmissibility function (FT) is too big;

updating, when the clutch is operated in opening or closure, the transmissibility function (FT) of the clutch by using the torque ($T_C$) transmitted by the clutch determined according to the estimation of the torque ($T_E$) delivered by the engine, i.e. by data determined using the model of the engine which is considered as a true reference such that the transmissibility function (FT) and the model of the engine have the same type of errors; and using for the next control of the clutch the transmissibility function (FT) which has been updated having as a true reference the model of the engine.

\* \* \* \* \*